(12) United States Patent
Fontaine et al.

(10) Patent No.: US 8,408,011 B2
(45) Date of Patent: Apr. 2, 2013

(54) STRUCTURAL REINFORCEMENT STRUT FOR GAS TURBINE CASE

(75) Inventors: Mike Fontaine, Candiac (CA); Rene Paquet, Montreal (CA); Jean Fournier, Longueuil (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1007 days.

(21) Appl. No.: 12/433,250

(22) Filed: Apr. 30, 2009

(65) Prior Publication Data

US 2010/0275614 A1 Nov. 4, 2010

(51) Int. Cl.
*F02C 7/20* (2006.01)

(52) U.S. Cl. ......... 60/796; 60/797; 29/889.21; 228/101; 228/225

(58) Field of Classification Search ............... 60/796, 60/797; 415/215.1; 29/889.21, 889.22, 527.1, 29/897.2, 890.08; 228/101, 225–227
See application file for complete search history.

(56) References Cited

U.S. PATENT DOCUMENTS

| | | | |
|---|---|---|---|
| 1,554,546 A * | 9/1925 | Austin | 219/55 |
| 3,024,969 A * | 3/1962 | Russell | 415/210.1 |
| 3,171,944 A * | 3/1965 | Linnander | 219/137 R |
| 3,502,287 A * | 3/1970 | Lindsay | 244/54 |
| 4,058,700 A * | 11/1977 | Ito et al. | 219/137 R |
| 4,068,964 A * | 1/1978 | Stoker | 403/272 |
| 4,097,716 A * | 6/1978 | Reichelt et al. | 219/137 R |
| 4,247,037 A | 1/1981 | Tamai et al. | |
| 4,541,480 A | 9/1985 | Beckmann | |
| 4,987,736 A * | 1/1991 | Ciokajlo et al. | 60/797 |
| 5,024,582 A | 6/1991 | Bellows et al. | |
| 5,233,149 A * | 8/1993 | Killian et al. | 219/76.12 |
| 5,494,539 A | 2/1996 | Tsujimura et al. | |
| 5,511,949 A | 4/1996 | Thore | |
| 5,807,074 A | 9/1998 | Fournier et al. | |
| 6,148,517 A | 11/2000 | Johnson et al. | |
| RE37,562 E | 2/2002 | Clark et al. | |
| 6,676,008 B1 | 1/2004 | Trapp et al. | |
| 7,100,358 B2 | 9/2006 | Gekht et al. | |
| 7,121,806 B2 | 10/2006 | Smith et al. | |
| 2011/0081240 A1 * | 4/2011 | Durocher et al. | 415/209.3 |

* cited by examiner

*Primary Examiner* — William H Rodriguez
(74) *Attorney, Agent, or Firm* — Norton Rose Canada LLP

(57) ABSTRACT

A gas turbine engine case having a working fluid flow, includes inner and outer case portions defining an annular duct for directing the working fluid flow, and a plurality of struts positioned within the annular duct and extending between the inner and outer case portions. The struts are welded to the inner and outer case portions with a first weld along a peripheral line of the respective struts and with second weld, of fillet type, in selected locations for additionally connecting a portion of each strut to the respective inner and outer case portions.

12 Claims, 7 Drawing Sheets

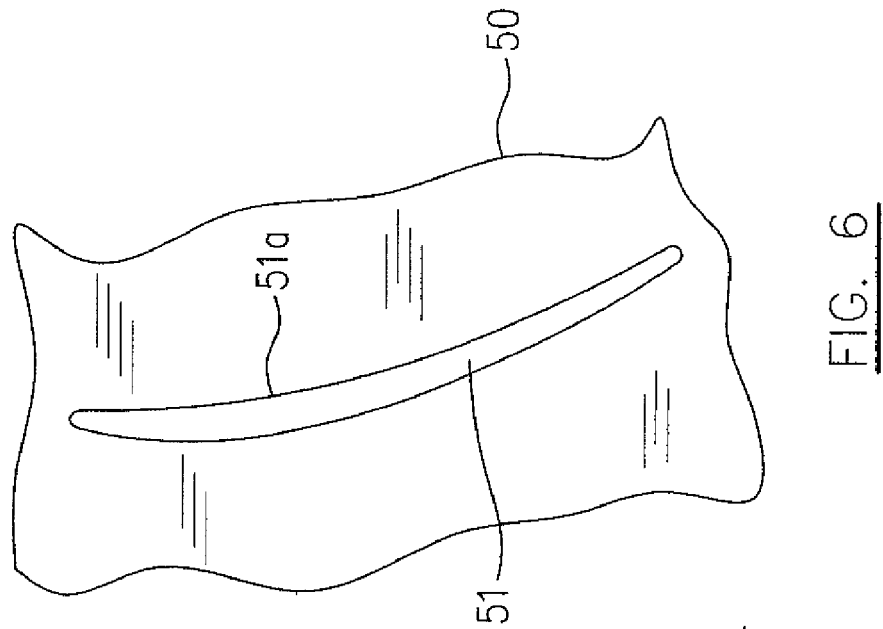
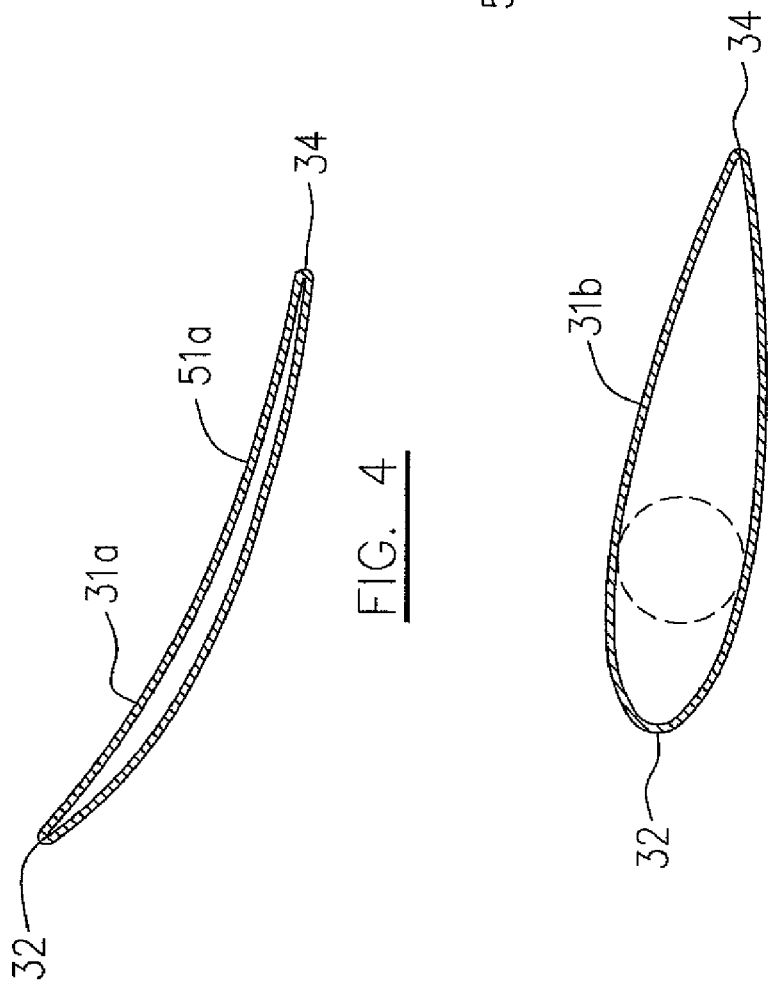

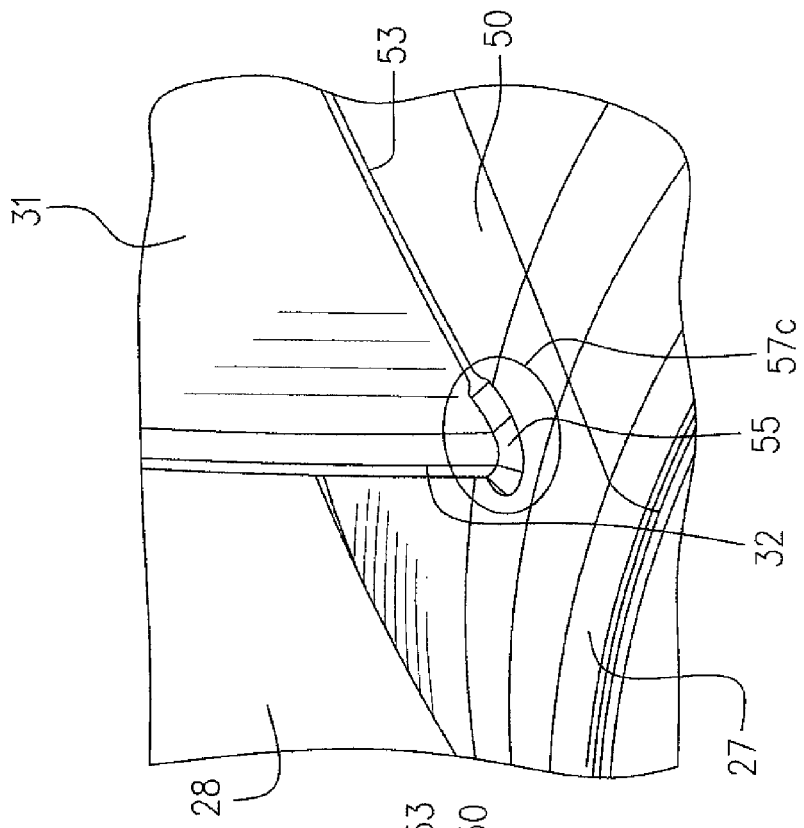
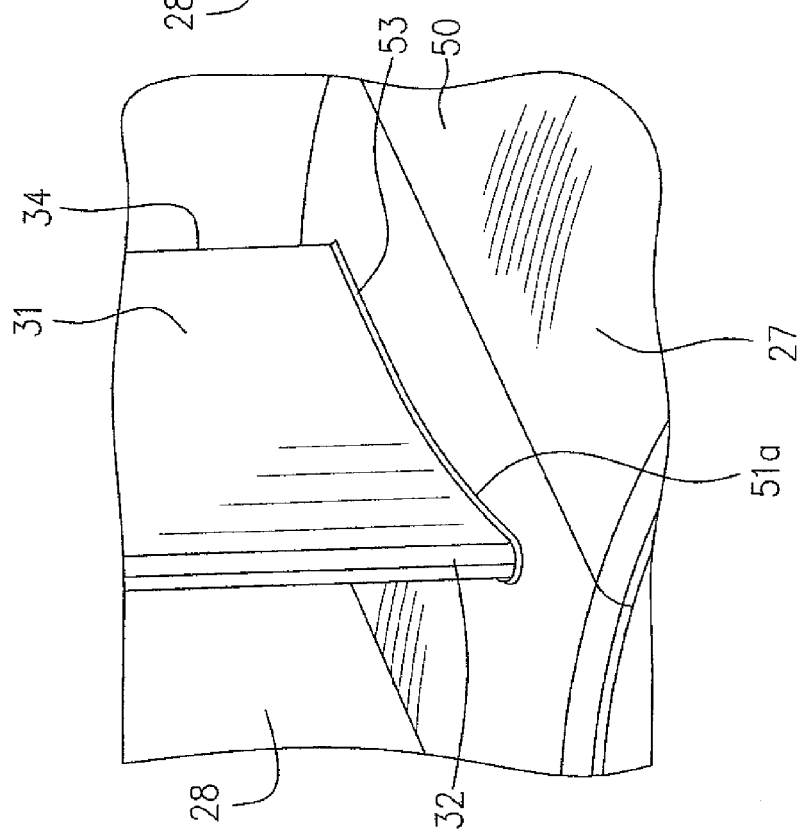

STRUCTURAL REINFORCEMENT STRUT FOR GAS TURBINE CASE

TECHNICAL FIELD

The described concept relates generally to a case of a gas turbine engine.

BACKGROUND OF THE ART

A "non-structural" turbine exhaust case is typically used for gas turbines and is basically little more than an aerodynamic fairing which carries no additional load other than its own weight and any aerodynamic loading affected thereon. A "structural" turbine exhaust case on the other hand, not only supports its own weight and any aerodynamic loading, but also supports a bearing housing and bearing for a main spool of the engine, typically, the low pressure spool. Present state of the art structural turbine exhaust cases demand a configuration with an improved strength-to-weight ratio and sheet metal components such as struts welded to the turbine exhaust cases. However, due to the stress concentration at leading and trailing edges between the struts and case walls, a significant number (referred to as high count) of struts are required in a structural turbine exhaust case, which increases the weight and manufacturing costs of engines. Accordingly, there is a need for a configuration of a turbine exhaust case with a relatively low strut count.

SUMMARY

In accordance with one aspect of the described concept, there is gas turbine engine having a case, the case comprising: inner and outer case portions defining an annular gas path therebetween, the inner case portion including a bearing housing portion configured to support a main spool bearing of the gas turbine engine and the outer case including a connection apparatus for mounting the case to the gas turbine engine; a plurality of struts extending between the inner and outer case portions, the struts structurally connecting the inner case portion to the outer case portion and supporting the inner case portion relative to the outer case portion; and wherein each of the struts has a first weld between opposite ends and the inner and outer case portions, the first weld substantially evenly and continuously distributed around an entire periphery of the strut to form a primary joint between the strut and each of the inner and outer case portions, and wherein each of the struts has a pair of second welds of fillet type provided intermittently around the periphery of the strut, the second welds disposed on the first weld adjacent to leading and trailing edges of the strut.

In accordance with another aspect of the described concept there is a gas turbine engine case for a working fluid flow comprising: metal inner and outer case portions defining an annular duct for directing the working fluid flow; a plurality of aerodynamically profiled metal struts positioned within the annular duct and extending between the inner and outer case portions, the struts structurally connecting and supporting the inner case portion to the outer case portion; and wherein each of the struts is welded at opposed ends thereof to the respective inner and outer case portions with a first weld substantially evenly and continuously distributed along an entire peripheral line of the strut between the strut and the respective inner and outer case portions, and with an at least one second weld of fillet type, at least in one selected location to form a reinforcement portion for additionally connecting a portion of the strut to the respective inner and outer case portions.

In accordance with a further aspect of the described concept there is a method of making a turbine exhaust case of a gas turbine engine, the turbine exhaust case having a plurality of struts extending between inner and outer case portions, the struts structurally connecting the inner case portion to the outer case portion and supporting the inner case portion relative to the outer case portion, the method comprising: welding each of the struts at opposed ends thereof to the respective inner and outer case portions with a first weld substantially evenly and continuously distributed along an entire peripheral line of the strut to form a primary joint between the strut and the respective inner and outer case portions; applying second welds of fillet type intermittently around the periphery of each strut at opposite ends thereof, each of the second welds being added to the respective first welds in selected locations to form a reinforcement portion; and wherein the locations are selected in sections of each first weld where a maximum load stress exists with respect to an average load stress of the first weld; and wherein the count of the struts is determined in accordance with an enhanced stress-withstanding capacity of each first weld together with the reinforcement portions formed in the selected locations by the second welds of each strut.

Further details of these and other aspects of the described concept will be apparent from the detailed description and drawings included below.

BRIEF DESCRIPTION OF THE DRAWINGS

Reference will now be made to the accompanying drawings by way of illustration showing a preferred embodiment in which:

FIG. 4 is a cross-sectional view of a sheet metal strut of one configuration used in the structural turbine exhaust case of FIG. 2;

FIG. 5 is a cross-sectional view of a sheet metal strut of another configuration used in the structural turbine exhaust case of FIG. 2;

FIG. 6 is a partial top plan view of an outer case portion of the structural turbine exhaust case of FIG. 2, showing a profiled opening therein for receiving an outer end of the strut before welding;

FIG. 7 is a partial perspective view of the structural turbine exhaust case of FIG. 2 in a welding process in which a primary joint between the strut and an inner case portion is formed by applying a full penetration groove weld substantially evenly and continuously distributed along the entire peripheral line of the strut;

FIG. 8 is a partial perspective view similar to that of FIG. 7 showing the completion of the welding process in which a reinforcing joint is formed by additional fillet welds added to the primary joint at a selected location;

DETAILED DESCRIPTION

Figure 1:
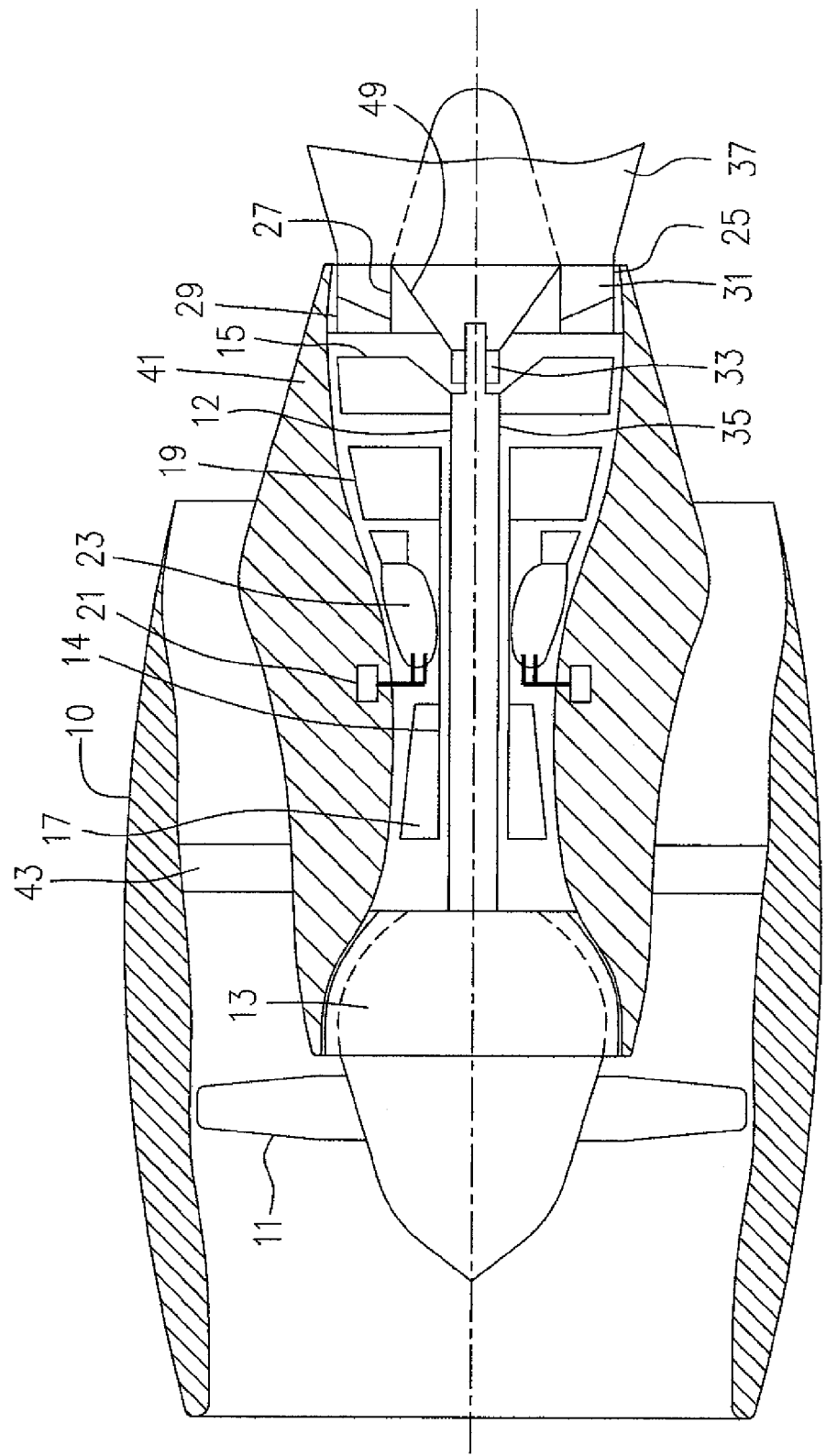
FIG. 1 is a cross-sectional view of a turbofan gas turbine engine, as an exemplary application of the present concept.

A turbofan gas turbine engine seen generally in FIG. 1 includes a housing or nacelle 10, a low pressure spool assembly seen generally at 12 which includes a fan 11, low pressure compressor 13 and low pressure turbine 15, a high pressure spool assembly seen generally at 14 which includes a high pressure compressor 17, high pressure turbine 19, a burner seen generally at 23 and fuel injecting means 21.

Figure 2:
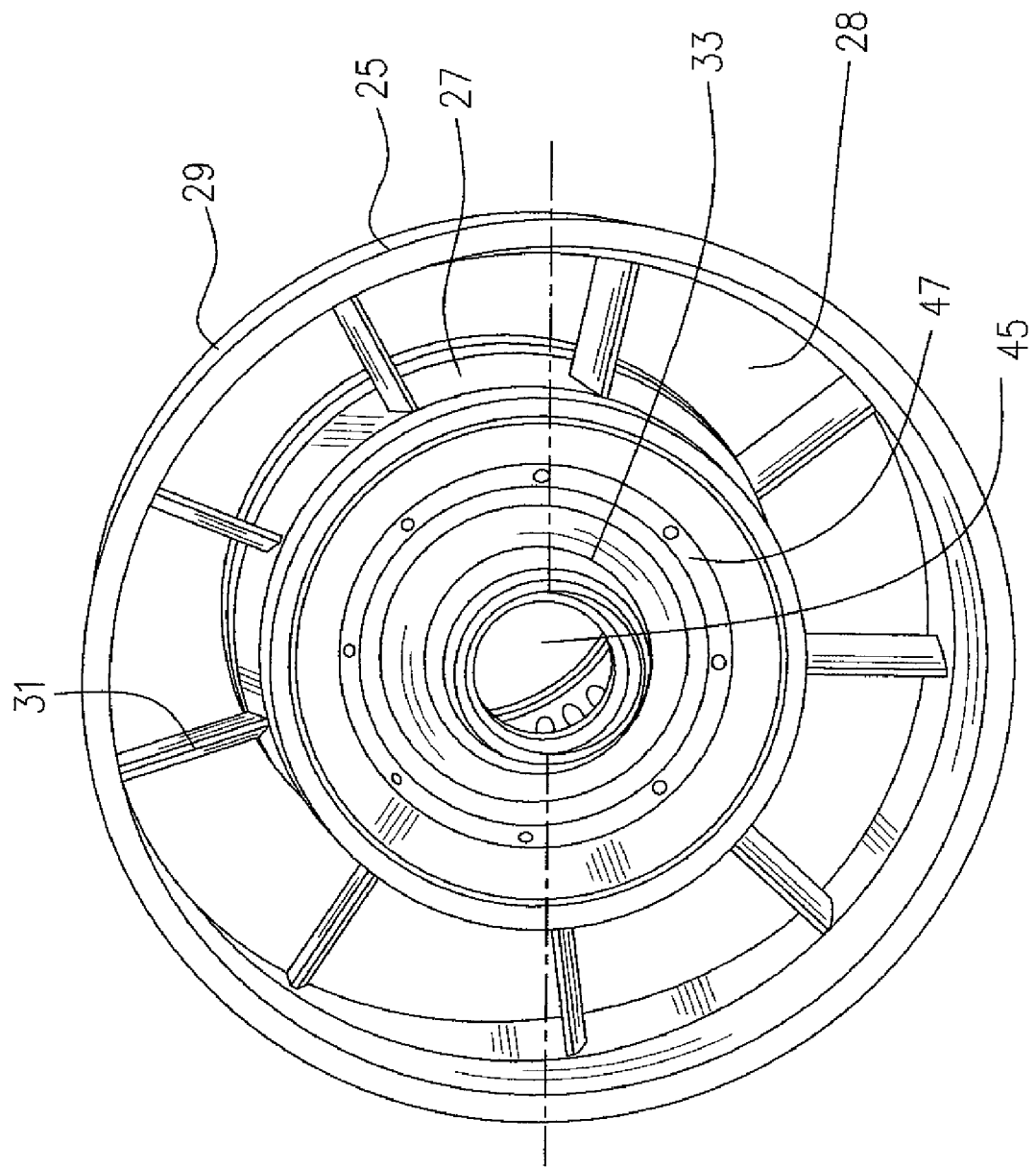
FIG. 2 is a perspective view of a structural turbine exhaust case used in the engine of FIG. 1 according to one embodiment.
Figure 3:
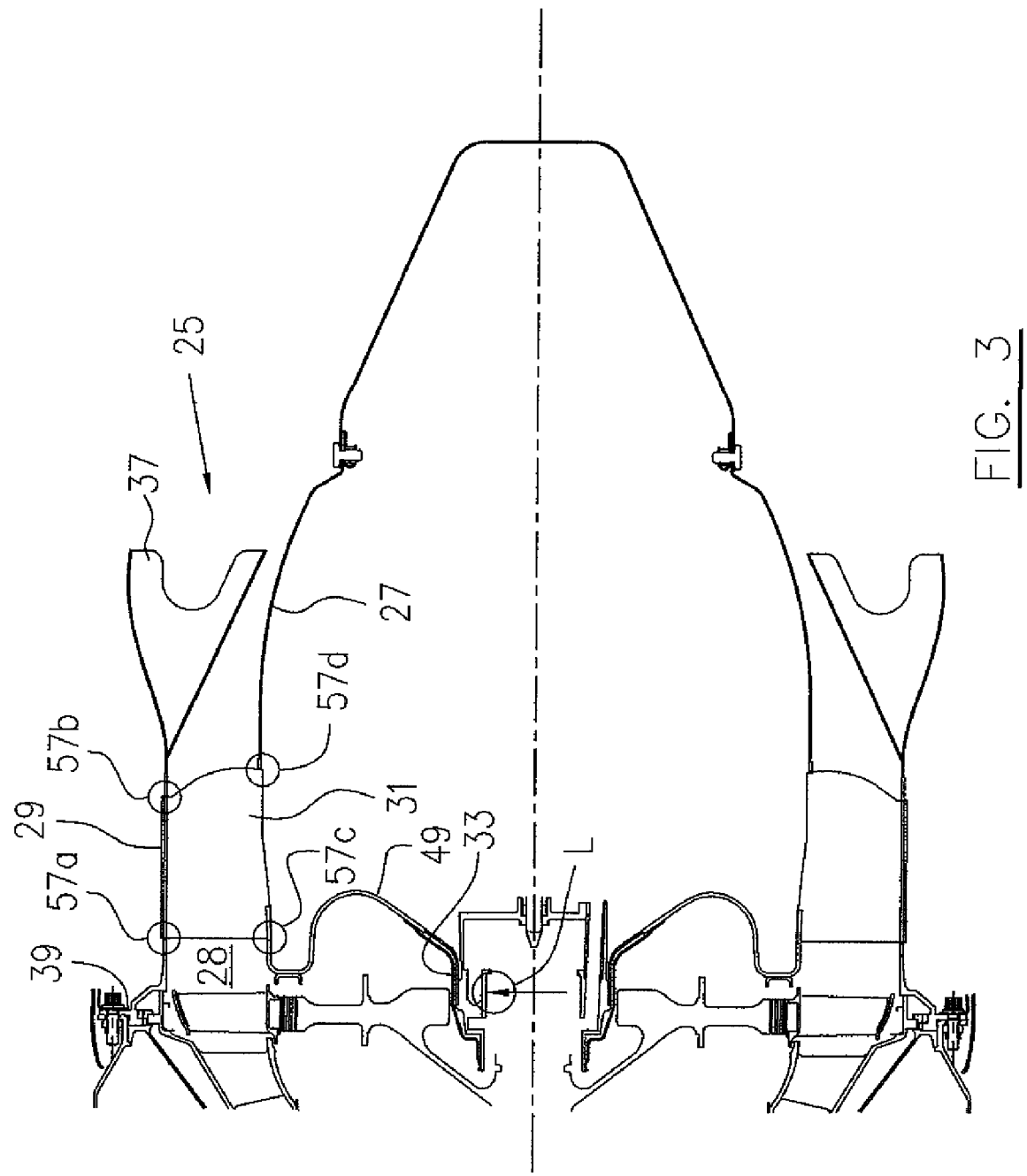
FIG. 3 is a cross-sectional view of the structural turbine exhaust case of FIG. 2, installed in the engine.

Referring to FIGS. 1 to 3, the turbofan gas turbine engine further includes a turbine exhaust case 25 which, as an example of the described concept includes an annular inner case portion 27 and an annular outer case portion 29 which defines an annular duct 28 therebetween, and a plurality of struts 31 circumferentially spaced apart, and radially extending within the annular duct 28 between the inner and outer case portions 27, 29, thereby structurally connecting same. A bearing housing 33 is co-axially connected to the inner case portion 27 for supporting an aft end of a main shaft 35 of the low pressure spool 12. Optionally, there is a mixer 37 attached to the aft end of the outer case portion 29. A mounting flange 39 is integrated with the outer case portion 29 at the front end thereof for securing the turbine exhaust case 25 to an engine case 41 which is in turn structurally connected to the nacelle 10 through a plurality of radially extending struts 43.

In operation, combustion gases discharged from the burner 23 power the high and low pressure turbines 19 and 15, and are then exhausted into the annular gas path 28 defined between the inner and outer case portions 27, 29. The tangential components included in the exhaust gases are deswirled by the struts 31 of the turbine exhaust case 25, and then the exhaust gases are discharged into the atmosphere through the mixer 37 which facilitates the mixing of the exhaust gases with the bypass air flow. The turbofan gas turbine engine is supported by an aircraft frame (not shown), for example by being suspended from the wings (not shown) by a mounting structure (not shown) connected to the nacelle 10. Therefore, the turbine exhaust case 25 is part of the mechanical support chain for supporting the weight of the entire engine. In particular, the turbine exhaust case 25 supports a major portion of the weight of the low pressure spool 12, in addition to bearing its own weight and the aerodynamic loads thereon effected by the exhaust gases.

In accordance with one embodiment of the described concept, the struts 31 of the turbine exhaust case 25 may be made of sheet metal. All components of the turbine exhaust case 25 are optionally made in fabricating processes different from a casting process, thereby avoiding porosity defects formed therein. For example, there may be sheet metal struts, sheet metal inner and outer case portions and machined bearing housing 33 made of a forged component. The mixer 37 may be also optionally made of sheet metal fabricated in a pressing process.

The bearing housing 33 includes a cylindrical body (not numbered) defining a bore 45 machined in an accurate size for accommodating a bearing (not shown) of the main shaft 35 of the low pressure spool 12. The bearing housing 33 further includes a flange portion 47 radially and upwardly extending from an aft end of the cylindrical body. The flange portion 47 of the bearing housing 33 is connected by a plurality of bolts (not indicated), or alternatively by welding, to an inner support structure of the inner case portion 27 of the turbine exhaust case 25. The inner support structure of the inner case portion 27 includes a truncated conical structure 49 (more clearly seen in FIG. 3) extending inwardly, radially and forwardly from the forward end of the inner case portion 27, to be connected to the bearing housing 33. The truncated conical structure 49 may also be made of sheet metal which can be integrated with the inner case portion 27, or may be welded to the inner case portion 27. As can be seen in FIG. 3, the cross sectional profile of conical structure 49 is somewhat like a hair pin which, as the skilled reader will understand in light of this disclosure, gives the sheet metal conical structure 49 the desired stiffness to permit adequate structural support for the bearing housing 33. The smooth, profiled bends of inner case portion 27 from gas path to bearing chamber, provide a configuration which permits a sheet metal construction to reliably support the bearing and spool components.

Referring to FIGS. 2 to 4, the struts 31 are made of sheet metal bent in a forming process to thereby form a hollow airfoil configuration 31a or 31b as shown in respective FIGS. 4 and 5. The opposed ends of the bent sheet metal(s) are joined by welding of a groove weld or edge weld type (not indicated). The welding line may be applied at either a leading edge 32 or a trailing edge 34 of the strut. Alternatively, each of the airfoils 31a and 31b may be made of two pieces of sheet metal spaced apart to form the hollow configuration. The two spaced pieces of sheet metal are join together at the leading edge 32 and trailing edge 34 of the airfoil in a welding process. The hollow airfoil configuration 31b presents a relatively thicker profiled cross-section which provides a relatively large interior space to allow services and pipes (represented by a circular broken line) to pass there through. One airfoil configured with the thicker configuration 31b is provided in the turbine exhaust case 25 (see FIG. 2) for permitting oil pipes (not shown) to pass there through for delivering oil to the bearing housing 33. The remaining airfoils provide only aerodynamic functions the inner space thereof is not used. Therefore said remaining airfoils may be configured with a thinner configuration 31a as shown in FIG. 4, to present a relatively thin cross-sectional profile.

Each of the struts 31 is welded at opposed ends thereof to the respective inner and outer case portions 27, 29 to form the complete structure of the turbine exhaust case 25. The sheet metal mixer 37 is connected to the outer case portion 29 by bolts (not shown) fastening the adjoining flanges (not shown) of the respective turbine exhaust case 25 and the mixer 37, as shown in FIG. 3. However, the mixer 37 may be alternatively welded at the front end thereof to the aft end of the outer case portion 29 of the turbine exhaust case 25. In a turbine exhaust case fabrication process, the components thereof may be connected in any desired sequence, and are not limited by the above described order Referring to FIGS. 3-8 and FIGS. 10a and 10b, a method of an improved welded design according to one embodiment is described, in particular, a method for welding the struts 31 to a case wall 50 of the respective inner and outer case portions 27, 29. The case wall 50 of the respective inner and outer case portions 27, 29 may be provided with a plurality of profiled openings 51 (only one is shown in FIG. 6) in locations where the struts 31 are to be connected. However, these profiled openings 51 may not be necessarily required, depending on individual configurations of the turbine exhaust cases. The profiled opening 51 in this embodiment corresponds to the profiled cross-section of an end of a corresponding strut 31 to be welded to the case wall 50 such that the strut 31 can be inserted from one side of the case wall 50 into the profiled opening 51 and fittingly received therein for a further welding process. A strut peripheral line indicated by reference numeral 51a is shown both in FIGS. 4 and 6.

A first step of the welding process is to weld each of the struts 31 such as airfoil 31a, at opposed ends thereof to the respective inner and outer case portions 27, 29 with a first weld 53 of the full penetration groove weld type, which is substantially evenly and continuously distributed along the entire strut peripheral line 51a of the strut 31 such as airfoil 31a, to form a primary joint (not numbered) between the strut 31 and the respective inner and outer case portions 27, 29. FIG. 7 shows an example of the primary joint formed by the first weld 53 between the inner end of one strut 31 and the case wall 50 of the inner case portion 27. A groove weld is a weld made in a groove between the work pieces. Square edges without a gap are also considered to be a groove (see FIG. 10a). The first weld 53 may be, for example, applied from one side of the respective inner and outer case portions 27, 29, to penetrate the entire thickness of the case wall 50 of the respective inner and outer case portions 27, 29, as described in Applicant's U.S. Pat. No. 7,100,358 issued Sep. 5, 2006 which is incorporated by reference herein.

Figure 10A:
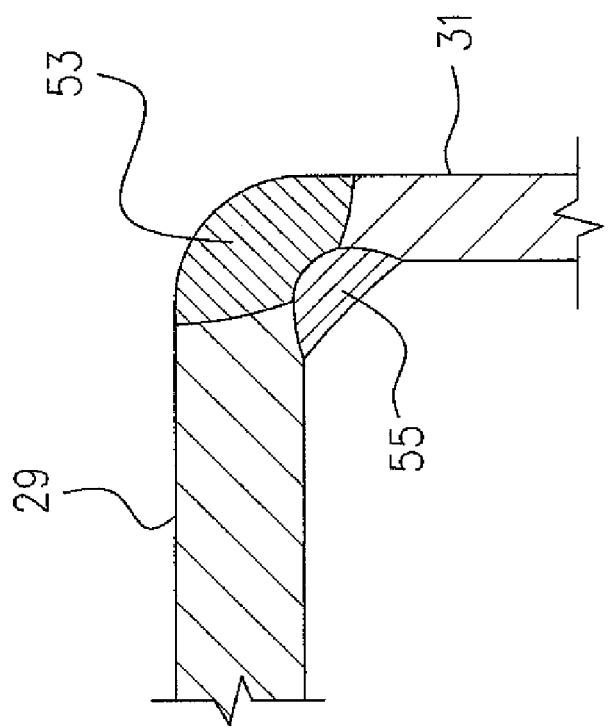
FIG. 10a is a partial cross-sectional view of a corner joint of the strut and the outer case portion of the structural turbine exhaust case, showing a first weld of a groove weld type.
Figure 10B:
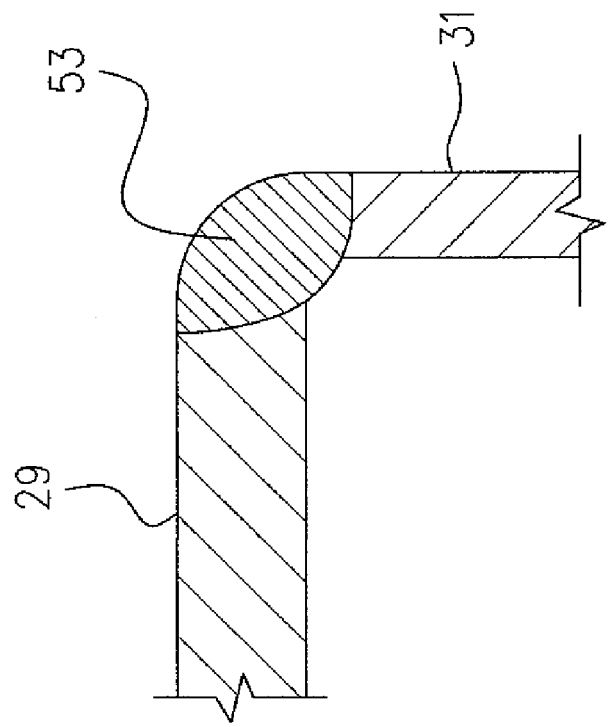
FIG. 10b is a view similar to that of FIG. 10a, showing the first weld reinforced by a second weld of a fillet weld type.

The next step of the welding process is to apply a second weld 55 of the fillet weld type, intermittently around the periphery of the strut at opposed ends thereof. The second weld 55 is added to the primary joint formed by the first weld 53 at selected locations in order to form reinforcement portions (not numbered). A fillet weld is a weld of an approximately triangular section, joining two surfaces approximately at a right angle to each other (FIG. 10b). The reinforcement portion formed by the second weld 55 added to each primary joint in each location, may be positioned to directly connect a portion of strut 31 with the case wall 50 of the respective inner and outer case portions 27, 29, rather than being only added to the primary joint.

The reinforcement portions formed by the second weld 55 are applied in selected locations of each primary joint where a maximum load stress exists with respect to an average load stress of the primary joint. As shown in FIG. 3, a maximum load (indicated by arrows) location L of the turbine exhaust case 25 according to this embodiment, is on the bearing housing 33. Therefore locations 57a, 57b, 57c and 57d at the respective leading and trailing edge areas of each strut 31 adjacent to the respective inner and outer case portions 27, 29, can be identified as locations of maximum stress on each of the struts 31 (location 57c is particularly illustrated in the circled area of FIG. 8), as a result of the maximum load acting on the location L. The reinforcement portions formed by the second weld 55 are located in the areas 57a, 57b, 57c, and 57d, respectively and are added to the respective primary joints which are formed by the first weld 53 on the respective inner and outer case portions 27, 29, according to this embodiment. Optionally, each reinforcement portion may extend divergently from the leading or trailing edge of the strut 31 in a limited length, as shown in FIG. 8.

Figure 9:
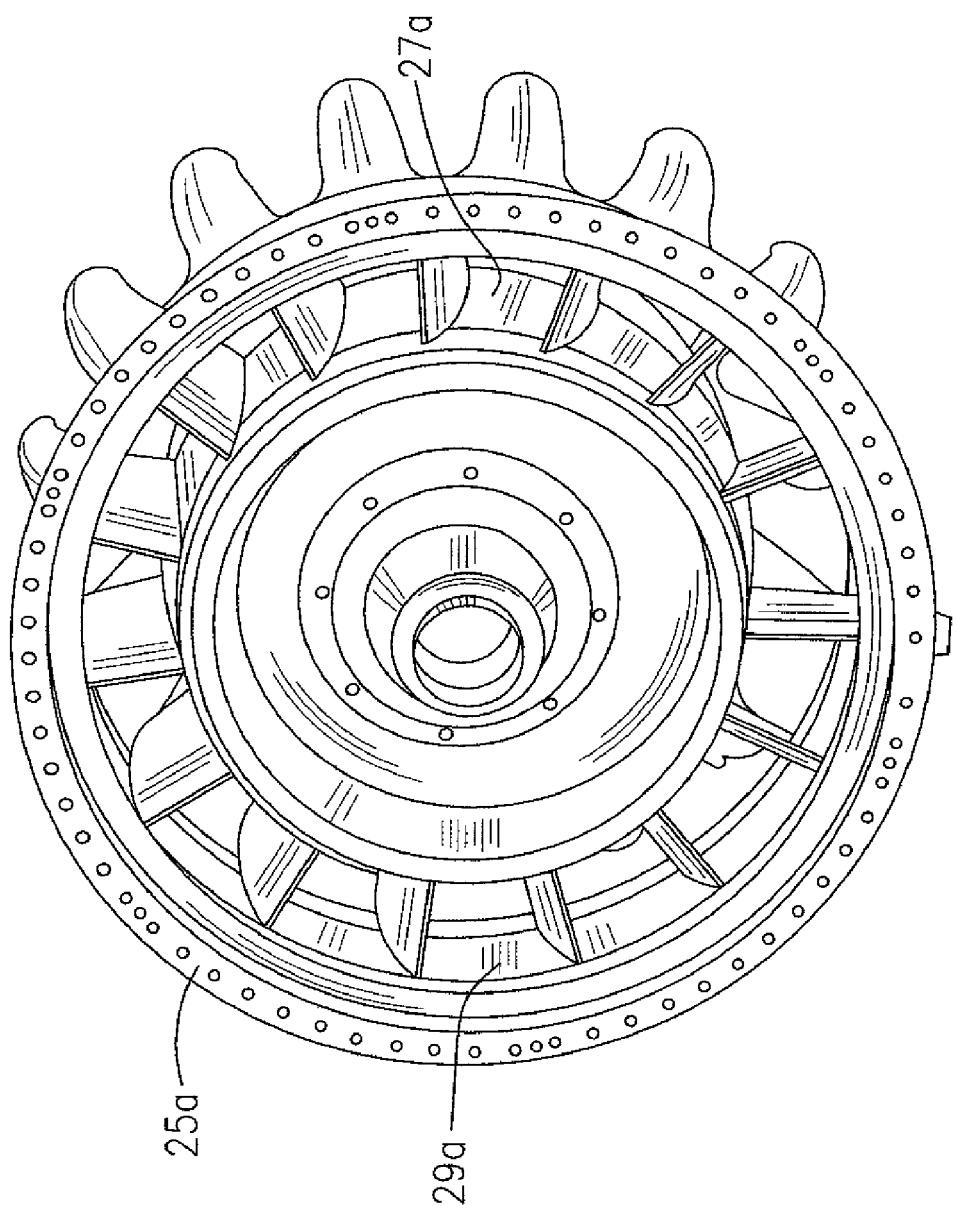
FIG. 9 is a perspective view of a structural turbine exhaust case.

The reinforcement portions may facilitate providing a structural turbine exhaust case having stronger struts 31 and/or a lower strut count because the number of struts 31 may be determined in accordance with the enhanced stress-withstanding capacity of each primary joint together with the second weld 55 of each strut 31. The number of struts 31 of the turbine exhaust case 25 in FIG. 2 is significantly reduced with respect to the number of the struts of the prior art turbine exhaust case 25a shown in FIG. 9. The prior art structural turbine exhaust case 25a of FIG. 9 has the struts (not numbered) connected to the respective inner and outer case portions 27a, 29a by conventional welding, without a reinforcing weld.

It should be noted that although the welding method of the described concept is directed to a fabricating process of welding struts to the respective inner and outer case portions of a turbine exhaust case. This method is applicable for welding similar components in gas turbine engine cases for a working fluid, such as air or combustion gases used in low or high compressor assemblies, or for low or high turbine assemblies of gas turbine engines. Although a turbofan gas turbine engine is described as an exemplary application of the described concept, the described concept is applicable to gas turbine engines of other types.

Modifications and improvements to the above described embodiments of the described concept may become apparent to those skilled in the art, for example, all components of the turbine exhaust case including the struts, inner and outer case portions and bearing housing may be made of metal materials such as those made in a forging or casting process. The inner and outer cast portions may also be made of sheet metal. Furthermore, the first weld 53 forming the primary joint at one end of the strut 31, may be applied from both the inner and outer sides of the case wall of the respective inner and outer case portions, and may be a fillet or groove weld, of partial or full penetration type. Although the second weld 55 forming the reinforcement portions are added to the primary joint at locations disposed on a side of the respective inner and outer case portions within the annular duct 28 as shown in FIG. 8, it should be noted that the second weld 55, of fillet type, forming the reinforcement portions may be added to either one of, or both inner and outer sides of the case wall of the respective inner and outer case portions, particularly in embodiments in which the end of the strut 31 is inserted through the profiled opening of, and radially projects from, the case wall of the respective inner and outer case portions. For example, the first weld 53 may be applied from one side of the case wall and does not penetrate the entire thickness of the case wall while the second weld 55, of fillet type, in each selected location may be applied from the other side of the same case wall of the respective inner and outer case portions such that the reinforcements formed by the second fillet weld 55 are not added directly to the primary joint formed by the first weld 53, but form additional direct connections between a portion of the strut and the case wall of the respective inner and outer case portions. Still, other modifications which fall within the scope of the present invention will be apparent to those skilled in the art, in light of a review of this disclosure and such modifications are intended to fall within the appended claims.

The invention claimed is:

1. A gas turbine engine having a case, the case comprising:
inner and outer case portions defining an annular gas path therebetween, the inner case portion including a bearing housing portion configured to support a main spool bearing of the gas turbine engine and the outer case including a connection apparatus for mounting the case to the gas turbine engine;
a plurality of struts extending between the inner and outer case portions, the struts structurally connecting the inner case portion to the outer case portion and supporting the inner case portion relative to the outer case portion; and
wherein each of the struts has a first weld between opposite ends and the inner and outer case portions, the first weld substantially evenly and continuously distributed around an entire periphery of the strut to form a primary joint between the strut and each of the inner and outer case portions, and wherein each of the struts has a pair of second welds of fillet type provided intermittently around the periphery of the strut, the second welds disposed on the first weld adjacent to leading and trailing edges of the strut.

2. The gas turbine engine as claimed in claim 1 wherein the second welds added to each primary weld adjacent to leading and trailing edges of the strut, directly connect a portion of the strut with the respective inner and outer case portions.

3. The gas turbine engine as claimed in claim 1 wherein each of the second welds extends divergently from the leading or trailing edge of the strut in a limited length.

4. The gas turbine engine as claimed in claim 1 wherein the struts are made of sheet metal.

5. The turbine exhaust case as claimed in claim 1 wherein the inner and outer case portions are made of sheet metal.

6. The gas turbine engine as claimed in claim 1 wherein the bearing housing is forged.

7. A gas turbine engine case for a working fluid flow comprising:
   metal inner and outer case portions defining an annular duct for directing the working fluid flow;
   a plurality of aerodynamically profiled metal struts positioned within the annular duct and extending between the inner and outer case portions, the struts structurally connecting and supporting the inner case portion to the outer case portion;
   wherein each of the struts is welded at opposed ends thereof to the respective inner and outer case portions with a first weld substantially evenly and continuously distributed along an entire peripheral line of the strut between the strut and the respective inner and outer case portions, and with an at least one second weld of fillet type, at least in one selected location to form a reinforcement portion for additionally connecting a portion of the strut to the respective inner and outer case portions; and
   wherein the second weld is provided intermittently around the periphery of the strut to form two said reinforcement portions for each of the first welds, one portion being in a first location adjacent to a leading edge of the strut and the other portion being in a second location adjacent to a trailing edge of the strut.

8. The gas turbine engine case as claimed in claim 7 wherein each of the first welds penetrates through an entire thickness of a case wall of the respective inner and outer case portions.

9. The gas turbine engine case as claimed in claim 7 wherein the second welds for each first weld in the respective locations are disposed on a side of the respective inner and outer case portions within the annular duct.

10. A gas turbine engine case for a working fluid flow comprising:
    metal inner and outer case portions defining an annular duct for directing the working fluid flow;
    a plurality of aerodynamically profiled metal struts positioned within the annular duct and extending between the inner and outer case portions, the struts structurally connecting and supporting the inner case portion to the outer case portion;
    wherein each of the struts is welded at opposed ends thereof to the respective inner and outer case portions with a first weld substantially evenly and continuously distributed along an entire peripheral line of the strut between the strut and the respective inner and outer case portions, and with an at least one second weld of fillet type, at least in one selected location to form a reinforcement portion for additionally connecting a portion of the strut to the respective inner and outer case portions; and
    wherein the second weld is provided intermittently around the periphery of the strut and is added to each first weld in each of selected locations, each of the second welds in each said selected location extending divergently from respective leading and trailing edges of the strut in a limited length.

11. The gas turbine engine case as claimed in claim 10 wherein each of the first welds penetrates through an entire thickness of a case wall of the respective inner and outer case portions.

12. The gas turbine engine case as claimed in claim 10 wherein the second welds for each first weld in the respective locations are disposed on a side of the respective inner and outer case portions within the annular duct.

* * * * *